United States Patent
Park et al.

(10) Patent No.: US 8,509,170 B2
(45) Date of Patent: Aug. 13, 2013

(54) APPARATUS AND METHOD FOR TRANSMITTING PREAMBLE IN BROADBAND WIRELESS COMMUNICATION SYSTEM

(75) Inventors: Sung-Eun Park, Seoul (KR); Chi-Woo Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 12/967,477

(22) Filed: Dec. 14, 2010

(65) Prior Publication Data

US 2011/0149893 A1    Jun. 23, 2011

(30) Foreign Application Priority Data

Dec. 18, 2009   (KR) .................. 10-2009-0126775

(51) Int. Cl.
   *H04W 4/00*   (2009.01)
(52) U.S. Cl.
   USPC ............................ 370/329; 370/334; 370/208
(58) Field of Classification Search
   USPC ......................................... 370/329–334, 208
   See application file for complete search history.

(56) References Cited

U.S. PATENT DOCUMENTS

| 2007/0268975 | A1 | 11/2007 | Yoon et al. | |
| 2008/0112356 | A1 | 5/2008 | Jung et al. | |
| 2008/0253320 | A1 | 10/2008 | Piggin et al. | |
| 2010/0034219 | A1* | 2/2010 | Stadelmeier et al. | 370/478 |
| 2010/0226322 | A1* | 9/2010 | Choi et al. | 370/329 |
| 2011/0007690 | A1* | 1/2011 | Chang et al. | 370/328 |
| 2011/0086645 | A1* | 4/2011 | Choi et al. | 455/452.1 |
| 2011/0134825 | A1* | 6/2011 | Kim et al. | 370/312 |
| 2012/0015645 | A1* | 1/2012 | Moon et al. | 455/422.1 |

FOREIGN PATENT DOCUMENTS

WO   2009/114478 A1   9/2009

* cited by examiner

*Primary Examiner* — Gary Mui
(74) *Attorney, Agent, or Firm* — Jefferson IP Law, LLP

(57) ABSTRACT

Preamble transmission in a broadband wireless communication system is provided. A method for transmitting a preamble includes determining a sequence as the preamble according to a transmit bandwidth, allocating sub-blocks of the sequence to a plurality of transmit antennas used to transmit the preamble, the number of the sub-blocks allocated to each antenna falling within two consecutive integers, and transmitting the preamble through the plurality of the transmit antennas according to the allocation result of the sub-blocks.

36 Claims, 7 Drawing Sheets

APPARATUS AND METHOD FOR TRANSMITTING PREAMBLE IN BROADBAND WIRELESS COMMUNICATION SYSTEM

PRIORITY

This application claims the benefit under 35 U.S.C. §119 (a) of a Korean patent application filed in the Korean Intellectual Property Office on Dec. 18, 2009 and assigned Serial No. 10-2009-0126775, the entire disclosure of which is hereby incorporated by reference.

BACKGROUND OF THE INVENTION

1. Field of the Invention

The present invention relates to a broadband wireless communication system. More particularly, the present invention relates to an apparatus and a method for transmitting a Secondary Advanced (SA) preamble to distinguish a cell identifier in a broadband wireless communication system.

2. Description of the Related Art

Nowadays, a number of wireless communication techniques are suggested as a candidate for rapid mobile communication. Among them, an Orthogonal Frequency Division Multiplexing (OFDM) scheme is reckoned as the most dominant next-generation wireless communication technology. The OFDM scheme transmits data using multiple carriers.

Using the OFDM scheme, a base station transmits pre-arranged signals so that a terminal can acquire time synchronization and identify the base station. Herein, the pre-arranged signal can be given various names according to a system. For example, the pre-arranged signal is referred to as a preamble. The terminal can acquire the time synchronization with the base station based on the preamble received from the base station and identify its base station. A location of the resource carrying the preamble is agreed between the base station and the terminal in advance. For example, the Institute of Electrical and Electronics Engineers (IEEE) 802.16m standard, which adopts the OFDM technology, defines a Primary Advanced (PA) preamble and a Secondary Advanced (SA) preamble. The PA preamble is used for the time synchronization and the SA preamble is used to identify the base station. The SA preamble includes a plurality of sub-blocks.

When the base station uses a plurality of transmit antennas to transmit the preamble, appropriate policies are necessary to determine which antenna transmits the preamble and how the sub-blocks of the preamble are distributed per antenna. The distribution of the sub-blocks determines utilization of a maximum transmit power of the antennas, which can cause imbalance of the transmit power with respect to the sub-blocks. Hence, what is needed is an efficient alternative for the base station using the transmit antennas to distribute the sub-blocks of the preamble per antenna.

SUMMARY OF THE INVENTION

An aspect of the present invention is to address at least the above-mentioned problems and/or disadvantages and to provide at least the advantages described below. Accordingly, an aspect of the present invention to provide an apparatus and a method for increasing transmission efficiency of a preamble to identify a base station in a broadband wireless communication system.

Another aspect of the present invention is to provide an apparatus and a method for distributing sub-blocks of a preamble to identify a base station, to a plurality of antennas in a broadband wireless communication system.

In accordance with an aspect of the present invention, a method for transmitting a preamble in a broadband wireless communication system is provided. The method includes determining a sequence as the preamble according to a transmit bandwidth, allocating sub-blocks of the sequence to a plurality of transmit antennas used to transmit the preamble, wherein the number of the sub-blocks allocated to each antenna is within two consecutive integers, and transmitting the preamble through the plurality of the transmit antennas according to the allocation result of the sub-blocks.

In accordance with another aspect of the present invention, a method for receiving a preamble in a broadband wireless communication system is provided. The method includes determining a channel bandwidth using a first preamble, determining the number of sub-blocks of a sequence of a second preamble according to the channel bandwidth, and receiving the second preamble according to time synchronization acquired using the first preamble and the number of the sub-blocks.

In accordance with yet another aspect of the present invention, an apparatus of a transmitting end for transmitting a preamble in a broadband wireless communication system is provided. The apparatus includes a generator for determining a sequence as the preamble according to a transmit bandwidth, an allocator for allocating sub-blocks of the sequence to a plurality of transmit antennas used to transmit the preamble, wherein the number of the sub-blocks allocated per antenna is within two consecutive integers, and a transmitter for transmitting the preamble through the plurality of the transmit antennas according to the allocation result of the sub-blocks.

In accordance with still another aspect of the present invention, an apparatus of a receiving end for receiving a preamble in a broadband wireless communication system is provided. The apparatus includes a controller for determining a channel bandwidth using a first preamble, and for determining the number of sub-blocks of a sequence of a second preamble according to the channel bandwidth, and a receiver for receiving the second preamble according to time synchronization acquired using the first preamble and the number of the sub-blocks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
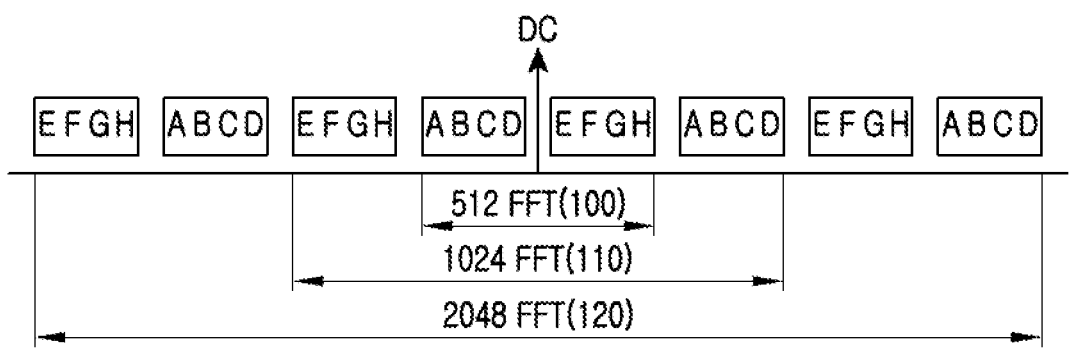
FIG. 1 illustrates a Secondary Advanced (SA) preamble in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for distributing sub-blocks of a preamble for identifying a base station, to a plurality of antennas in a broadband wireless communication system. Hereinafter, while the broadband wireless communication system is assumed to conform to the Institute of Electrical and Electronics Engineers (IEEE) 802.16m standard, the present invention is equally applicable to other broadband wireless communication systems adopting Orthogonal Frequency Division Multiplexing (OFDM). To ease the understanding, the preamble for identifying the base station is referred to as a Secondary Advanced (SA) preamble but can be given a different name in various embodiments.

A transmitting end conforming to the OFDM scheme generates a transmit OFDM symbol using an Inverse Fast Fourier Transform (IFFT) operation, and a receiving end converts the received OFDM symbol to signals per subcarrier using a Fast Fourier Transform (FFT) operation. The size of the IFFT/FFT operation is equal to the number of the subcarriers. In general, the size of the IFFT/FFT operation is proportional to a bandwidth. Hence, the size of the IFFT/FFT operation is used to indicate the bandwidth.

Hereafter, it is assumed that the FFT size for the bandwidth of 5 MHz is 512, the FFT size for the bandwidth of 10 MHz is 1024, and the FFT size for the bandwidth of 20 MHz is 2048. The FFT size and the bandwidth of the same meaning are used together.

FIG. 1 illustrates an SA preamble in a broadband wireless communication system according to an exemplary embodiment of the present invention.

When the FFT size is 512 as shown in FIG. 1, the SA preamble 100 includes eight sub-blocks [ABCD EFGH]. Each sub-block includes a certain number of symbols. For example, each sub-block includes a Quadrature Phase Shift Keying (QPSK) sequence of length 18.

When the FFT size is extended, SA preambles 110 and 120 for the extended FFT size repeat the structure of the sub-blocks of the SA preamble 100 for the FFT for the size 512. That is, when the bandwidth is extended, the structure of the SA preambles 110 and 120 for the extended bandwidth repeats the sub-blocks of the SA preamble 100 for 5 MHz. For example, the SA preamble 110 for the FFT size 1024 repeats the eight sub-blocks of the SA preamble 100 for the FFT size 512 one time in the structure. The SA preamble 120 for the FFT size 2048 repeats the eight sub-blocks of the SA preamble 100 for the FFT size 512 three times in the structure.

In general, the FFT sizes supported by the system increase by double. For example, the next size up of 512 is 1024 and the next size up of 1024 is 2048. Accordingly, the system uses the FFT of the size 512 for the bandwidth of 5 MHz and the FFT of the size 1024 for the 10 MHz bandwidth and thus maintains the same subcarrier spacing. However, when using a bandwidth that dos not correspond to a multiple of 2, for example, the bandwidth of 8.75 MHz, the transmitting end cannot use the FFT size of 1024 at the same subcarrier spacing as the subcarrier spacing for the bandwidth for 5 MHz or 10 MHz. In this case, the system can keep the same subcarrier spacing by use of Tone Dropping (TD).

The TD selects the SA preamble sub-blocks fitting the bandwidth by excluding some sub-blocks from the SA preamble. For instance, the transmitting end using 8.75 MHz can keep the same subcarrier spacing as in the bandwidth of 10 MHz by transmitting only sub-blocks corresponding to the band of 8.75 MHz in 10 MHz and not transmitting other sub-blocks. That is, the transmitting end can maintain the subcarrier spacing by taking only some sub-blocks corresponding to the 8.75 MHz bandwidth from 16 sub-blocks for the bandwidth of 10 MHz.

Figure 2:
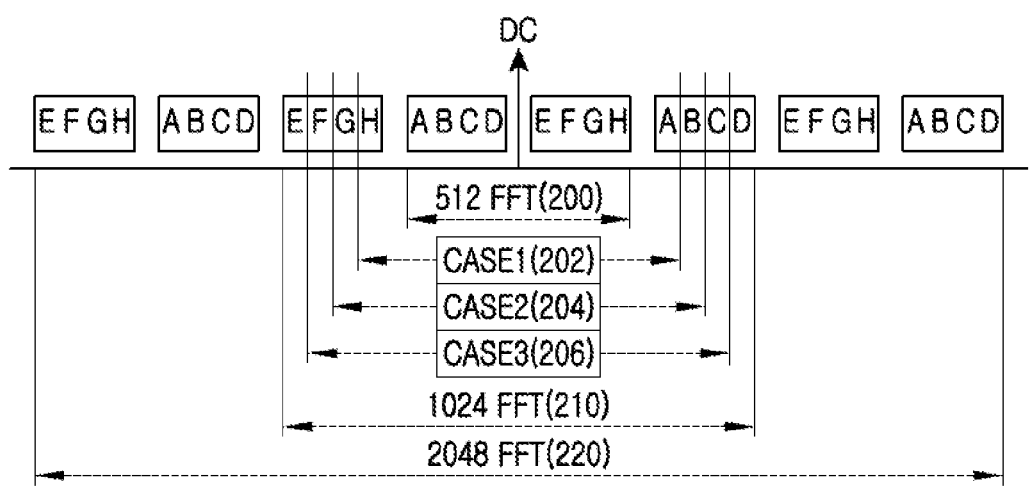
FIG. 2 illustrates a SA preamble when a Tone Dropping (TD) is adopted in a broadband wireless communication system according to an exemplary embodiment of the present invention.

Employing the TD scheme, the transmitting end can use a SA preamble as shown in FIG. 2. FIG. 2 illustrates a SA preamble when a TD is used in a broadband wireless communication system according to an exemplary embodiment of the present invention.

When the FFT size is 512 as shown in FIG. 2, the SA preamble 200 includes eight sub-blocks [ABCD EFGH]. Also, when the FFT size is 1024 the SA preamble 210 includes sixteen sub-blocks. In addition, when the FFT size is 2048 the SA preamble 220 includes thirty-two sub-blocks. However, when a bandwidth between 5 MHz and 10 MHz is used, the SA preamble is constructed by adding sub-blocks to both ends of the SA preamble 200 for the FFT size of 512 based on a Direct Current (DC) subcarrier. That is, the SA preamble for the bandwidth between 5 MHz and 10 MHz is constituted by excluding some outermost sub-blocks in the sequence for 10 MHz which is a minimum regular channel bandwidth greater than the bandwidth. For example, consider case 1 where the bandwidth exceeds 5 MHz and falls below 6.25 MHz. Here, a SA preamble 202 is constituted by adding one sub-block to both ends of the sub-blocks of the SA preamble 200 of the FFT size of 512. In other words, the SA preamble 202 is constituted by excluding some outermost sub-blocks in the sequence for the FFT size of 1024. For another example, consider case 2 where the bandwidth exceeds 6.25 MHz and falls below 7.5 MHz. Here, a SA preamble 204 is constituted by adding two sub-blocks to both ends of the sub-blocks of the SA preamble 200 of the FFT size of 512. For yet another example, consider case 1 where the bandwidth exceeds 7.5 MHz and falls below 10 MHz. Here, a SA preamble 206 is constituted by adding three sub-blocks to both ends of the sub-blocks of the SA preamble 200 of the FFT size of 512. The reference bandwidth such as 5 MHz, 10 MHz and 20 MHz is referred to as a regular channel bandwidth, and other bandwidths are referred to as irregular channel bandwidths.

For example, the sub-blocks of the SA preamble allocated to various irregular channel bandwidths are shown in Table 1.

TABLE 1

| Range of irregular channel bandwidth (MHz) | Number of sub-blocks ($N_{si}$) | Sub-blocks allocated |
|---|---|---|
| 5 < x < 6.25 | 8 | ABCD EFGH |
| 6.25 ≤ x < 7.5 | 10 | H ABCD EFGH A |
| 7.5 ≤ x < 8.75 | 12 | GH ABCD EFGH AB |
| 8.75 ≤ x < 10 | 14 | FGH ABCD EFGH ABC |
| 10 < x < 11.25 | 16 | EFGH ABCD EFGH ABCD |
| 11.25 ≤ x < 12.5 | 18 | D EFGH ABCD EFGH ABCD E |
| 12.5 ≤ x < 13.75 | 20 | CD EFGH ABCD EFGH ABCD EF |
| 13.75 ≤ x < 15 | 22 | BCD EFGH ABCD EFGH ABCD EFG |
| 15 ≤ x < 16.25 | 24 | ABCD EFGH ABCD EFGH ABCD EFGH |
| 16.25 ≤ x < 17.5 | 26 | H ABCD EFGH ABCD EFGH ABCD EFGH A |
| 17.5 ≤ x < 18.75 | 28 | GH ABCD EFGH ABCD EFGH ABCD EFGH AB |
| 18.75 ≤ x < 20 | 30 | FGH ABCD EFGH ABCD EFGH ABCD EFGH ABC |

The number and the type of the SA preamble sub-blocks allocated to the irregular channel bandwidth may be determined based on Table 1 according to the TD scheme. That is, when the irregular channel bandwidth is given, a base station determines the bandwidth range including the irregular bandwidth based on Table 1 and determines the total number and the type of the SA preamble sub-blocks allocated to the bandwidth. In so doing, when using a plurality of transmit antennas, the base station distributes the determined sub-blocks to the transmit antennas. The determined sub-blocks are distributed as follows. First, the number of the sub-blocks allocated to the antenna is determined based on Equation 1.

$$N_{st,k} = \left\lfloor \frac{N_{si} + N_t - 1 - \mod(k - p, N_t)}{N_t} \right\rfloor \quad (1)$$

$$p = \left\lfloor \frac{N_t - \mod(N_{si}, N_t)}{2} \right\rfloor$$

In Equation 1, $N_{st,k}$ denotes the number of the sub-blocks allocated to the antenna k, $N_{si}$ denotes the total number of the sub-blocks for the irregular channel bandwidth, $N_t$ denotes the number of the transmit antennas, and k denotes an antenna index. k has a value of 0, 1, . . . , $N_t$–1.

As the number of the sub-blocks per antenna are determined based on Equation 1, the number of the sub-blocks allocated to the antennas are the same, or fall within two consecutive integers. That is, in the defined total number of the sub-blocks, the numbers of the sub-blocks allocated to the antennas have the uniform distribution at maximum.

Next, the location of the sub-blocks allocated to the antenna is determined as described below. When $N_{si}$-ary sub-blocks are indexed as 0, 1, . . . , $N_{si}$–1 from the left side of the frequency axis, the index of the sub-blocks allocated to the antenna k is determined based on Equation 2.

$$\text{location of sub-blocks allocated to antenna } k = t + \sum_{i=0}^{k-1} N_{st,i} \quad (2)$$

In Equation 2, t denotes an integer between zero and $N_{st,k}$–1, and $N_{st,i}$ denotes the numbers of the sub-blocks allocated to the antenna i. $N_{st,-1}$ is zero.

A specific example of the sub-block allocation per antenna based on Equation 1 and Equation 2 is described below. FIGS. 3A through 3D illustrate an allocation of SA preamble sub-blocks per transmit antenna in a broadband wireless communication system according to an exemplary embodiment of the present invention. In FIG. 3, it is assumed that the same subcarrier spacing as in the regular bandwidth 20 MHz is maintained in the irregular channel bandwidth of 12 MHz using the TD scheme. According to Table 1, the SA preamble includes sub-blocks [D EFGH ABCD EFGH ABCD E].

Figure 3A:
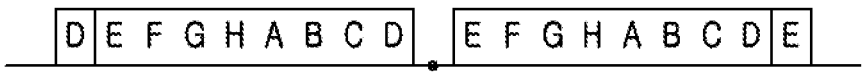
FIGS. 3A through 3D illustrate allocation of SA preamble sub-blocks per transmit antenna in a broadband wireless communication system according to an exemplary embodiment of the present invention.

As for a single transmit antenna, the sub-block allocation per antenna is omitted and the sub-blocks [D EFGH ABCD EFGH ABCD E] of FIG. 3A are allocated to the single transmit antenna.

Figure 3B:
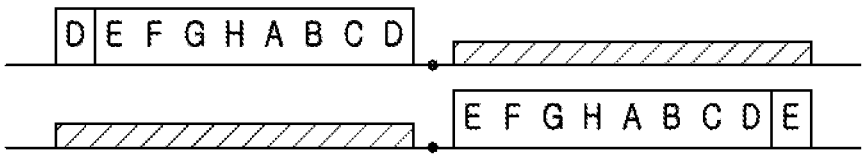

When two transmit antennas are given, the sub-block allocation per antenna is performed based on Equation 1 and Equation 2. When $N_t$ is substituted by 2 and $N_{si}$ is substituted by 18 in Equation 1, the number of the sub-blocks allocated to each antenna is determined to be 9. Based on Equation 2, the indexes of the sub-blocks allocated to the antenna 0 are determined to be 0 through 8 and the indexes of the sub-blocks allocated to the antenna 1 are determined to be 9 through 17. Consequently, the sub-blocks are allocated per antenna as shown in FIG. 3B.

Figure 3C:
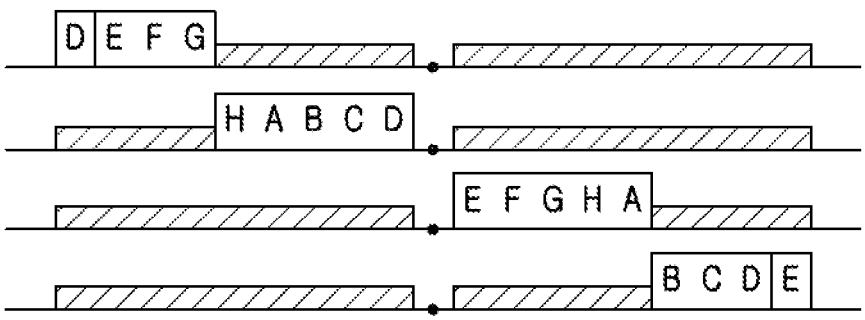

When four transmit antennas are given, the sub-block allocation per antenna is performed based on Equation 1 and Equation 2. When $N_t$ is substituted by 4 and $N_{si}$ is substituted by 18 in Equation 1, $N_{st,0}$ is determined to be 4, $N_{st,1}$ is determined to be 5, $N_{st,2}$ is determined to be 5, and $N_{st,3}$ is determined to be 4. Based on Equation 2, the indexes of the sub-blocks allocated to the antenna 0 are determined to be 0 through 3, the indexes of the sub-blocks allocated to the antenna 1 are determined to be 4 through 8, the indexes of the sub-blocks allocated to the antenna 2 are determined to be 9 through 13, and the indexes of the sub-blocks allocated to the antenna 3 are determined to be 14 through 17. Consequently, the sub-blocks are allocated per antenna as shown in FIG. 3C.

Figure 3D:
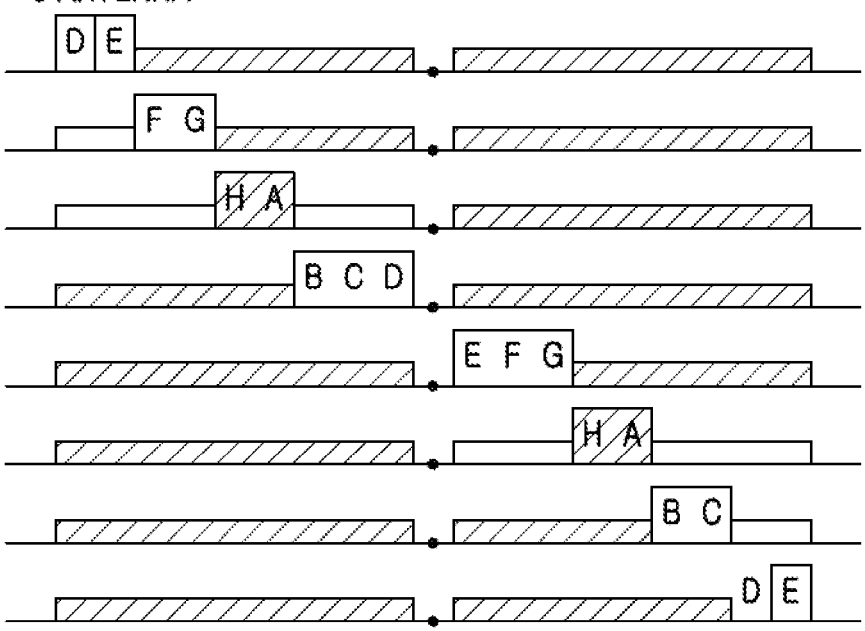

When eight transmit antennas are given, the sub-block allocation per antenna is performed based on Equation 1 and Equation 2. When $N_t$ is substituted by 8 and $N_{si}$ is substituted by 18 in Equation 1, $N_{st,0}$ is determined to be 2, $N_{st,1}$ is determined to be 2, $N_{st,2}$ is determined to be 2, $N_{st,3}$ is determined to be 3, $N_{st,4}$ is determined to be 3, $N_{st,5}$ is determined to be 2, $N_{st,6}$ is determined to be 2, and $N_{st,7}$ is determined to be 2. Based on Equation 2, the indexes of the sub-blocks allocated to the antenna 0 are determined to be 0 and 1, the indexes of the sub-blocks allocated to the antenna 1 are determined to be 2 and 3, the indexes of the sub-blocks allocated to the antenna 2 are determined to be 4 and 5, the indexes of the sub-blocks allocated to the antenna 3 are determined to be 6, 7 and 8, the indexes of the sub-blocks allocated to the antenna 4 are determined to be 9, 10 and 11, the indexes of the sub-blocks allocated to the antenna 5 are determined to be 12 and 13, the indexes of the sub-blocks allocated to the antenna 6 are determined to be 14 and 15, and the indexes of the sub-blocks allocated to the antenna 7 are determined to be 16 and 17. Consequently, the sub-blocks are allocated per antenna as shown in FIG. 3D.

Now, operations and structure of the transmitting transmit which transmits the SA preamble as stated above are elucidated by referring to the drawings.

Figure 4:
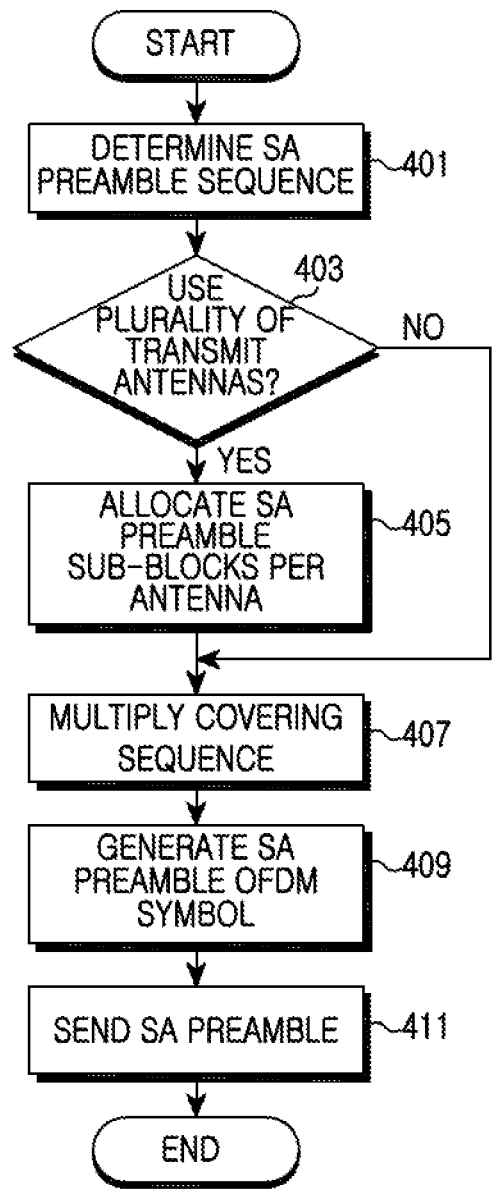
FIG. 4 illustrates a method for transmitting a SA preamble in a broadband wireless communication system according to an exemplary embodiment of the present invention.

FIG. 4 illustrates a method for transmitting a SA preamble in a broadband wireless communication system according to an exemplary embodiment of the present invention.

The transmitting end determines the sequence to use as the SA preamble in step 401. In more detail, the transmitting end stores eight sub-blocks for the minimum unit bandwidth as the basic sequence for identifying itself, and determines the SA preamble sequence using the stored sub-blocks according to the bandwidth for transmitting the SA preamble. For example, using the bandwidth of 5 MHz, the transmitting end determines the sequence including the eight sub-blocks. Using the regular channel bandwidth greater than 5 MHz, the transmitting end determines the sequence including the repetitive eight sub-blocks as shown in FIG. 1. Alternatively, using the irregular channel bandwidth, the transmitting end determines the sequence of Table 1 according to the TD scheme. Specifically, the transmitting end extends the sub-block unit to the both ends of the frequency axis based on the DC subcarrier and determines the SA preamble sequence. That is, the transmitting end determines the sequence by excluding some outermost sub-blocks in the sequence for the minimum regular channel bandwidth greater than the irregular channel bandwidth.

In step 403, the transmitting end determines whether to transmit the SA preamble through the plurality of the transmit antennas. The transmitting end includes the plurality of the transmit antennas, and transmits the SA preamble through all or some of the transmit antennas. The number of the antennas used among the plurality of the transmit antennas can be determined by, but not limited to, various factors such as channel conditions and reception capability of terminal. When transmitting the SA preamble through one transmit antenna, the transmitting end goes to step 407.

By contrast, when transmitting the SA preamble through multiple transmit antennas, the transmitting end allocates the SA preamble sub-blocks per antenna in step 405. That is, the transmitting end distributes the sub-blocks of the SA preamble determined in step 401, to the transmit antennas. In so doing, the transmitting end allocates the sub-blocks such that the numbers of the sub-blocks allocated to the antennas have a uniform distribution at maximum; that is, such that the numbers of the sub-blocks allocated to the antennas are the same or fall within two consecutive integers. For example, the transmitting end determines the numbers of the sub-blocks per antenna based on Equation 1 and determines the location of the sub-blocks per antenna based on Equation 2.

In step 407, the transmitting end multiplies the SA preamble sequences including the sub-blocks per antenna by a covering sequence. The multiplication of the covering sequence is to decrease a Peak to Average Power Ratio (PAPR) of the signal, which can be omitted in various exemplary embodiments. The transmitting end stores a plurality of covering sequences, and multiplies the SA preamble sequences by the sequence corresponding to the shape of the transmitted SA preamble among the stored sequences. For example, the covering sequence is determined by the FFT size, the number of the transmit antennas, the location and the number of the SA preamble sub-blocks, and so on.

In step 409, the transmitting end generates at least one OFDM symbol of the SA preamble. More specifically, the transmitting end generates a time-domain signal by applying the IFFT operation to the SA preamble sequence and generates the OFDM symbol by inserting a Cyclic Prefix (CP). In so doing, when the single transmit antenna is given, the transmitting end generates one OFDM symbol from the sequence through the single IFFT operation. When the plurality of the transmit antennas is given, the transmitting end inserts a null into the subcarriers not mapped with the sub-blocks in the per antenna sequence, and generates a plurality of OFDM symbols from the per antenna sequences through a number of IFFT operations corresponding to the number of transmit antennas.

In step 411, the transmitting end transmits the SA preamble. The transmitting end up-converts the at least one OFDM symbol of the SA preamble into a Radio Frequency (RF) signal and transmits the SA preamble through the one or more transmit antennas.

Referring to FIG. 4, the transmitting end determines the number and the location of the sub-blocks per antenna as described above. In various exemplary embodiments, the transmitting end can determine the number and the location of the sub-blocks per antenna using a predefined look-up table. In this case, the transmitting end stores the table relating to the number and the location of the per antenna sub-blocks, in which the number of the antennas and the bandwidth are used as look-up parameters, and determines the number and the location of the per antenna sub-blocks corresponding to the number of the antennas used and the bandwidth used by referring to the table.

Figure 5:
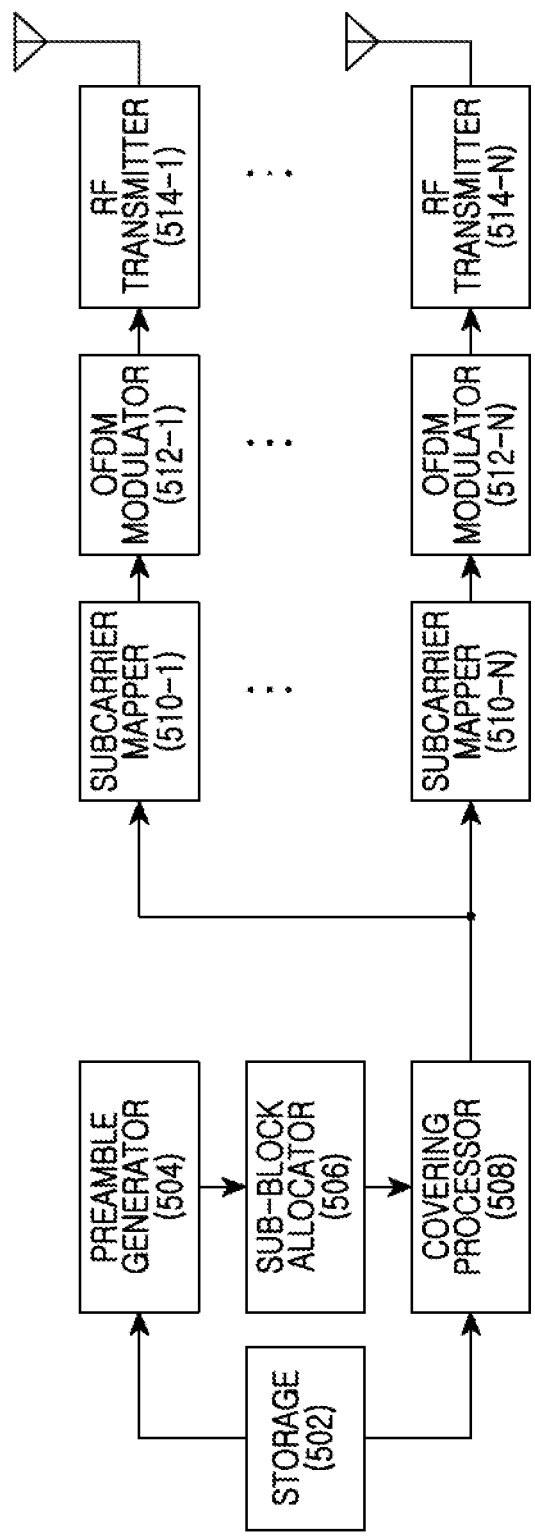
FIG. 5 illustrates a transmitting end for transmitting a SA preamble according to an exemplary embodiment of the present invention.

FIG. 5 is a block diagram of a transmitting end for transmitting a SA preamble according to an exemplary embodiment of the present invention.

The transmitting end of FIG. 5 includes a storage 502, a preamble generator 504, a sub-block allocator 506, a covering processor 508, a plurality of subcarrier mappers 510-1 through 510-N, a plurality of OFDM modulators 512-1 through 512-N, and a plurality of RF transmitters 514-1 through 514-N.

The storage 502 stores data required for the transmitting end to transmit the SA preamble. In more detail, the storage 502 stores the eight sub-blocks of the SA preamble for the minimum unit bandwidth, which is the basic sequence for identifying the transmitting end, and the covering sequences.

The preamble generator 504 generates the sequence to use as the SA preamble. The preamble generator 504 generates the SA preamble sequence using the eight sub-blocks stored to the storage 502 according to the bandwidth to carry the SA preamble. For example, when the bandwidth of 5 MHz is used, the preamble generator 504 generates the sequence including the eight sub-blocks. When the regular channel bandwidth greater than 5 MHz is used, the preamble generator 504 generates the sequence in which the eight sub-blocks are iterated as shown in FIG. 1. When the irregular channel bandwidth is used, the preamble generator 504 generates the sequence according to the TD scheme as shown in Table 1. The preamble generator 504 generates the SA preamble sequence as extending the sub-block to the both ends of the frequency axis based on the DC subcarrier.

The sub-block allocator 506 determines whether the SA preamble is transmitted through the plurality of the transmit antennas. When the SA preamble is transmitted through the single transmit antenna, the sub-block allocator 506 bypasses the sequence fed from the preamble generator 504. When the SA preamble is transmitted through the multiple transmit antennas, the sub-block allocator 506 distributes the sub-blocks of the sequence fed from the preamble generator 504 to the transmit antennas. In so doing, the sub-block allocator 506 allocates the sub-blocks such that the numbers of the sub-blocks allocated to the antennas have a uniform distribution at maximum; that is, such that the numbers of the sub-blocks allocated per antenna are the same or fall within two consecutive integers. For example, the sub-block allocator 506 determines the numbers of the sub-blocks per antenna based on Equation 1 and determines the location of the sub-blocks per antenna based on Equation 2.

The covering processor 508 multiplies the SA preamble sequences including the sub-blocks per antenna by the covering sequence. The covering processor 508, which functions to decrease the PAPR of the signal, can be omitted in the transmitting end. The covering processor 508 multiplies the SA preamble sequences by the sequence corresponding to the shape of the transmitted SA preamble among the sequences stored to the storage 502. For example, the covering sequence is determined by the FFT size, the number of the transmit antennas, the location and the number of the SA preamble sub-blocks, and so on.

The subcarrier mappers 510-1 through 510-N map the SA preamble sequence to subcarriers. When the SA preamble is transmitted through the multiple transmit antennas, the sub-blocks are mapped only to some subcarriers in each antenna. In this case, the subcarrier mappers 510-1 through 510-N process the subcarriers not mapped with the sub-blocks as a null. The OFDM modulators 512-1 through 512-N up-convert the SA preamble sequence mapped to the subcarriers to the time-domain signals through the IFFT operation, and generate at least one OFDM symbol of the SA preamble by inserting the CP. The RF transmitters 514-1 through 514-N up-convert the at least one OFDM symbol into the RF signal and transmits the SA preamble via the at least one transmit antenna.

Referring to FIG. 5, the sub-block allocator 506 determines the number and the location of the sub-blocks per antenna as described above. Alternatively, the sub-block allocator 506 can determine the number and the location of the sub-blocks per antenna using the predefined look-up table. In this case, the storage 502 stores the table relating to the number and the location of the per antenna sub-blocks, in which the number of the antennas and the bandwidth are used as the look-up parameters. The sub-block allocator 506 determines the number and the location of the per antenna sub-blocks corresponding to the number of antennas used and the bandwidth used by referring to the table.

Figure 6:
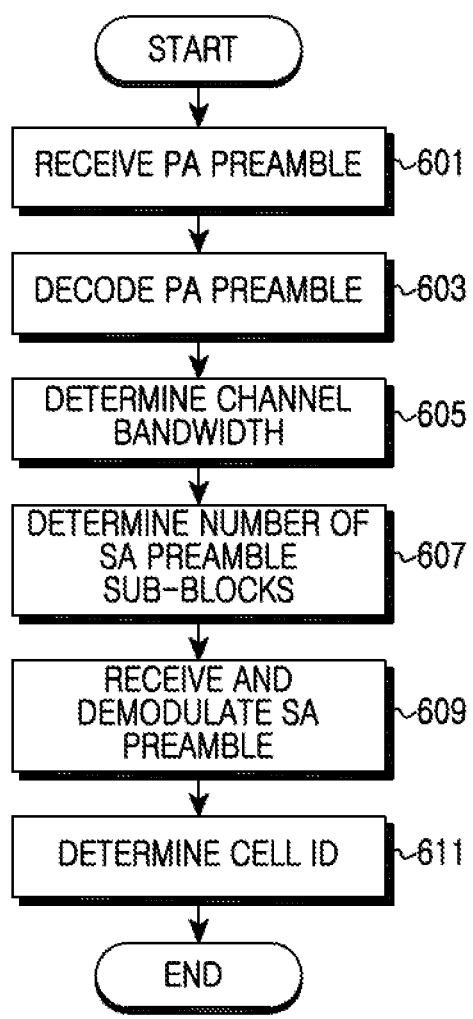
FIG. 6 illustrates a method for receiving a SA preamble in a broadband wireless communication system according to an exemplary embodiment of the present invention.

FIG. 6 illustrates a method for receiving a SA preamble in a broadband wireless communication system according to an exemplary embodiment of the present invention.

The receiving end receives the PA preamble in step 601. The receiving end converts the received RF signal to baseband sample data, and correlates the sample data in a sliding window manner. The PA preamble signal for the time synchronization is repeated twice in the time domain. The receiving end locates the signal repeated twice in the time domain; that is, detects the transmission point of the PA preamble through the correlation.

In step 603, the receiving end decodes the PA preamble. More specifically, the receiving end restores the frequency-domain signals from the time-domain signals of the PA preamble using the FFT operation, and demodulates the frequency-domain signals. Thus, the receiving end acquires one sequence. Herein, the sequence constituting the PA preamble indicates additional information, and the receiving end confirms the additional information. For example, the PA preamble can indicate the channel bandwidth. For example, the relation of the channel bandwidth and the PA preamble sequences is shown in Table 2.

TABLE 2

| Index | Carrier | BW | Series to modulate |
|---|---|---|---|
| 0 | Fully configured | 5 MHz | 6DB4F3B16BCE59166C9CEF7C3C8C A5EDFC16A9D1DC01F2AE6AA08F |
| 1 | | 7, 8.75, and 10 MHz | 1799628F3B9F8F3B22C1BA19EAF94F EC4D37DEE97E027750D298AC |
| 2 | | 20 MHz | 92161C7C19BB2FC0ADE5CEF3543AC 1B6CE6BE1C8DCABDDD319EAF7 |
| 3 | | reserved | 6DE116E665C395ADC70A8971690862 0868A60340BF35ED547F8281 |
| 4 | | reserved | BCFDF60DFAD6B027E4C39DB20D78 3C9F467155179CBA31115E2D04 |
| 5 | | reserved | 7EF1379553F9641EE6ECDBF5F144287 E329606C616292A3C77F928 |
| 6 | | reserved | 8A9CA262B8B3D37E3158A3B17BFA4 C9FCFF4D396D2A93DE65A0E7C |
| 7 | | reserved | DA8CE648727E4282780384AB53CEE BD1CBF79E0C5DA7BA85DD3749 |
| 8 | | reserved | 3A65D1E6042E8B8AADC701E210B5B 4B650B6AB31F7A918893FB04A |
| 9 | | reserved | D46CF86FE51B56B2CAA84F26F6F204 428C1BD23F3D888737A0851C |
| 10 | Partially configured | N/A | 640267A0C0DF11E475066F1610954B5 AE55E189EA7E72EFD57240F |

In Table 2, as the type of the carrier, 'Fully configured' and 'Partially configured' indicate the configuration of control channels in the multiple carrier transmission. 'Fully configured' indicates a carrier for which all control channels including synchronization, broadcast, multicast and unicast control signaling are configured. Further, information and parameters regarding multiple carrier operation and the other carriers can also be included in the control channels. 'Partially configured' indicates a downlink only carrier configured with control channels to support downlink transmission in a Time Division Duplex (TDD) communication or a downlink carrier having no corresponding uplink carrier in a Frequency Division Duplex (FDD) communication, and includes only control channels for the downlink transmission.

For example, when the system uses the irregular channel band of 12 MHz and the reserved sequence of index #3 is defined to the 12 MHz frequency band in Table 2, the sequence of the PA preamble includes '161C7C19BB2FC0ADE5CEF3543AC1B6CE6BE1C8D-CABDDD319EAF7' of the index #3.

The receiving end correlates the acquired sequence with the sequences of Table 2 and determines the sequence of the highest correlation value as the sequence transmitted from the transmitting end. Hence, the receiving end can acquire the channel bandwidth from the information of Table 2. At this time, it is assumed that the PA preamble is received without error and the sequence of the index #3 is detected with the highest correlation value.

In step 605, the receiving end determines the channel bandwidth based on the detected sequence. For instance, when the correlation value for '161C7C19BB2FC0ADE5CEF3543-AC1B6CE6BE1C8DCABDDD319EAF7' of the index #3 is the greatest, the receiving end determines that the channel bandwidth is 12 MHz based on Table 2.

In step 607, the receiving end determines the number of the sub-blocks of the SA preamble. Herein, the number of the sub-blocks of the SA preamble is determined according to the channel bandwidth. In more detail, the receiving end determines the number of the sub-blocks of the SA preamble using the correspondence information between the channel bandwidth and the number of the sub-blocks of the SA preamble of Table 1. In Table 1, when the channel bandwidth is 12 MHz, the number of the sub-blocks of the SA preamble is 18.

In step 609, the receiving end receives and demodulates the SA preamble including the determined number of the sub-blocks. The SA preamble is received at a predefined location in a frame. The receiving end, which knows the location of the PA preamble, can locate the SA preamble. Thus, the receiving end acquires the sequence of the SA preamble by demodulating the signal received at the determined location of the SA preamble.

In step 611, the receiving end acquires a cell IDentifier (ID) using the decoded SA preamble. The SA preamble, which is the signal for distinguishing the base station, indicates the cell ID. The receiving end determines the cell ID by decoding the sequence of the SA preamble.

While the irregular channel band of 12 MHz is assumed in FIG. 6, the present invention is equally applicable to the irregular channel band of other sizes.

As such, the terminal can determine the cell ID as shown in FIG. 6. The terminal determining the cell ID can acquire system information in the corresponding cell, and thus confirm the number of the antennas in the transmitting end of the preamble; that is, the base station of the corresponding cell. The terminal can determine the number and the location of the sub-blocks of the SA preamble allocated to each antenna based on Equation 1 and Equation 2.

Figure 7:
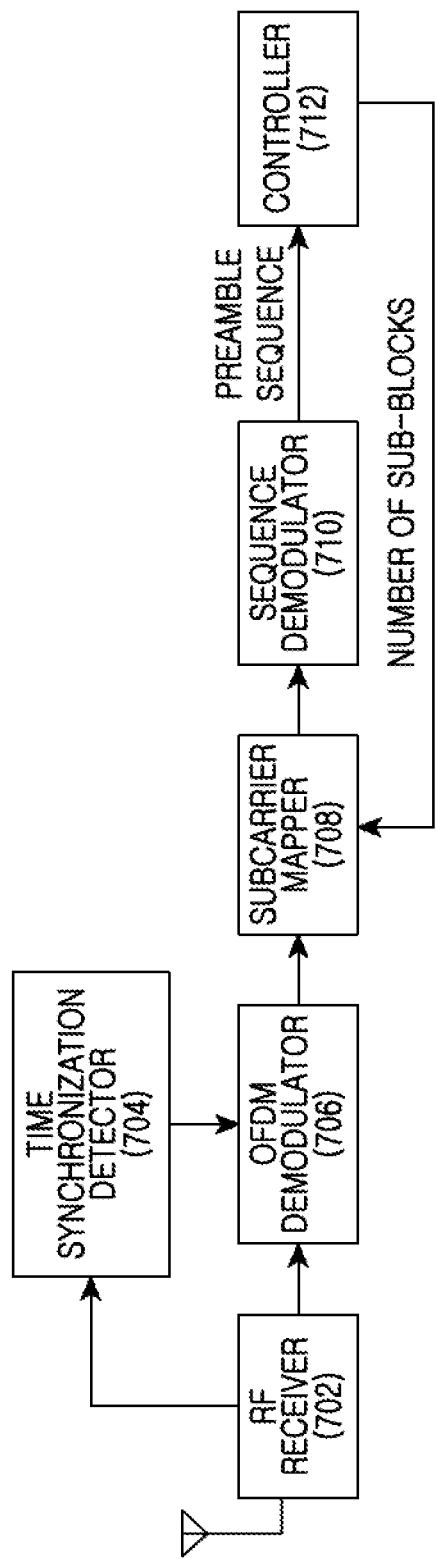
FIG. 7 illustrates a receiving end for receiving a SA preamble according to an exemplary embodiment of the present invention.

FIG. 7 is a block diagram of a receiving end for receiving a SA preamble according to an exemplary embodiment of the present invention.

The receiving end of FIG. 7 includes an RF receiver 702, a time synchronization detector 704, an OFDM demodulator 706, a subcarrier demapper 708, a sequence demodulator 710, and a controller 712.

The RF receiver 702 down-converts the RF signal received via an antenna to a baseband analog signal, and samples and converts the baseband analog signal into a digital signal.

The time synchronization detector 704 acquires the time synchronization (i.e., frame synchronization and superframe synchronization) by repeating the correlation in the sliding window manner. That is, the time synchronization detector 704 detects the PA preamble signal. Since the PA preamble signal for the time synchronization is repeated two times in the time domain, the time synchronization detector 704 locates the signal repeated twice using the correlation. Herein, while the time synchronization (frame synchronization and superframe synchronization) is acquired in the time domain, the time synchronization can be acquired also in the frequency domain.

The OFDM demodulator 706 restores the frequency-domain signals by applying the FFT operation to the sample data. For example, the OFDM demodulator 706 restores the frequency-domain signals of the PA preamble and restores the frequency-domain signals of the SA preamble. The subcarrier demapper 708 extracts and classifies the frequency-domain signals based on the processing unit. As extracting the frequency-domain signals of the SA preamble, the subcarrier demapper 708 refers to the sub-block number information of the SA preamble notified from the controller 712.

The sequence demodulator 710 generates the sequence of the PA preamble and the sequence of the SA preamble by demodulating the frequency-domain signals of the PA preamble and the frequency-domain signals of the SA preamble in a corresponding modulation scheme (e.g., Binary Phase Shift Keying (BPSK)) used at the transmitting end.

The controller 712 determines the channel bandwidth using the sequence of the PA preamble provided from the sequence demodulator 710, and determines the number of the sub-blocks of the SA preamble according to the channel bandwidth. The controller 712 notifies the number of the sub-blocks to the subcarrier demapper 708. For example, the controller 712 stores the mapping information of Table 2, calculates the correlation value of the sequence of the PA preamble fed from the sequence demodulator 710 and every sequence of Table 2, and confirms the channel bandwidth corresponding to the sequence having the maximum correlation value. Also, the controller 712 stores the mapping information of Table 1 and confirms the number of the sub-blocks corresponding to the channel bandwidth in Table 1.

As set forth above, as the sub-blocks of the SA preamble are uniformly distributed to the plurality of the transmit antennas at maximum in the broadband wireless communication system, the utilization of the transmit power of each transmit antenna can be maximized.

While the invention has been shown and described with reference to certain exemplary embodiments thereof, it will be understood by those skilled in the art that various changes in form and details may be made therein without departing form the spirit and scope of the invention as defined by the appended claims and their equivalents.

What is claimed is:

1. A method for transmitting a preamble in a wireless communication system, the method comprising:
    transmitting a preamble sequence through a plurality of transmit antennas,
    wherein a number of sub-blocks of the preamble sequence allocated to a $k^{th}$ antenna is determined based on the following equation:

$$N_{st,k} = \left\lfloor \frac{N_{si} + N_t - 1 - \text{mod}(k - p, N_t)}{N_t} \right\rfloor$$

$$p = \left\lfloor \frac{N_t - \text{mod}(N_{si}, N_t)}{2} \right\rfloor$$

where $N_{st,k}$ denotes the number of sub-blocks allocated to an antenna k, $N_{si}$ denotes the total number of sub-blocks for an irregular channel bandwidth, $N_t$ denotes the number of the transmit antennas, and k denotes an antenna index, k having a value of 0,1, . . . , $N_t-1$.

2. The method of claim 1, wherein the preamble is a signal for distinguishing a cell IDentifier (ID).

3. The method of claim 1, wherein the sub-blocks each are constituted with a Quadrature Phase Shift Keying (QPSK) sequence of length 18.

4. The method of claim 1, further comprising:
    before transmitting the preamble, multiplying the preamble by a covering sequence which decreases a Peak to Average Power Ratio (PAPR).

5. The method of claim 1, wherein the preamble sequence comprises sub-blocks where a total number of the sub-blocks corresponds to a channel bandwidth.

6. The method of claim 5, wherein the sub-blocks of the preamble are distributed to the transmit antennas based on at least one of a number of the transmit antennas and the total number of the sub-blocks.

7. The method of claim 6, wherein the determining of the preamble sequence comprises:
if the transmit bandwidth is a minimum regular channel bandwidth, determining sub-blocks for the minimum regular channel bandwidth as a sequence of the preamble;
if the transmit bandwidth is a regular channel bandwidth, determining a sequence repeating sub-blocks for a minimum bandwidth at least one time, as the sequence of the preamble; and
if the transmit bandwidth is an irregular channel bandwidth, determining the sequence of the preamble by excluding some outermost sub-blocks in a sequence for a minimum regular channel bandwidth greater than the transmit bandwidth.

8. The method of claim 6, wherein the transmitting of the preamble sequence comprises:
allocating the sub-block to each of the transmit antennas;
generating preamble signals to be transmitted through the transmit antennas; and
transmitting the preamble signal through the transmit antennas.

9. The method of claim 8, wherein the allocating of the sub-blocks comprises:
determining the number of sub-blocks per antenna; and
determining locations of the sub-blocks per antenna.

10. The method of claim 9, wherein the locations of the sub-blocks per antenna are determined so that consecutive sub-blocks are allocated to each of the transmit antennas.

11. The method of claim 10, wherein the locations of the sub-blocks allocated to the $k^{th}$ antenna are determined based on the following equation:

$$\text{location of sub-blocks allocated to antenna } k = t + \sum_{i=0}^{k-1} N_{st,i}$$

where t denotes an integer between zero and $N_{st,k}-1$, $N_{st,i}$ denotes the number of sub-blocks allocated to an antenna i, and $N_{st,-1}$ is zero.

12. The method of claim 1, further comprising:
determining the preamble sequence.

13. A method for receiving a preamble in a wireless communication system, the method comprising:
receiving a preamble sequence from a transmitting end through a plurality of transmit antennas,
wherein the number of sub-blocks of the preamble sequence allocated to a $k^{th}$ antenna is determined based on the following equation:

$$N_{st,k} = \left\lfloor \frac{N_{si} + N_t - 1 - \text{mod}(k - p, N_t)}{N_t} \right\rfloor$$

$$p = \left\lfloor \frac{N_t - \text{mod}(N_{si}, N_t)}{2} \right\rfloor$$

where $N_{st,k}$ denotes the number of sub-blocks allocated to an antenna k, $N_{si}$ denotes the total number of sub-blocks for an irregular channel bandwidth, $N_t$ denotes the number of the transmit antennas, and k denotes an antenna index, k having a value of $0, 1, \ldots, N_t-1$.

14. The method of claim 13, further comprising:
acquiring antenna number information of the transmitting end; and
determining the number and locations of the sub-blocks of the preamble sequence allocated to each of the transmit antennas.

15. The method of claim 13, wherein the preamble sequence comprises sub-blocks where a total number of the sub-blocks corresponds to a channel bandwidth.

16. The apparatus of claim 15, wherein, if the transmit bandwidth is a minimum regular channel bandwidth, the generator determines sub-blocks for the minimum regular channel bandwidth as a sequence of the preamble,
if the transmit bandwidth is a regular channel bandwidth, the generator determines a sequence repeating sub-blocks for a minimum bandwidth at least one time, as the sequence of the preamble, and
if the transmit bandwidth is an irregular channel bandwidth, the generator determines the sequence of the preamble by excluding some outermost sub-blocks in a sequence for a minimum regular channel bandwidth greater than the transmit bandwidth.

17. The method of claim 15, wherein the sub-blocks of the preamble are distributed to the transmit antennas based on at least one of a number of the transmit antennas and the total number of the sub-blocks.

18. The method of claim 17, wherein locations of the sub-blocks per antenna are determined so that consecutive sub-blocks are allocated to each of the transmit antennas.

19. The method of claim 18, wherein the locations of the sub-blocks allocated to the $k^{th}$ antenna are determined based on the following equation:

$$\text{location of sub-blocks allocated to antenna } k = t + \sum_{i=0}^{k-1} N_{st,i}$$

where t denotes an integer between zero and $N_{st,k}-1$, $N_{st,i}$ denotes the number of sub-blocks allocated to an antenna i, and $N_{st,-1}$ is zero.

20. An apparatus of a transmitting end for transmitting a preamble in a wireless communication system, the apparatus comprising:
a transmitter for transmitting a preamble sequence through a plurality of transmit antennas,
wherein a number of sub-blocks of the preamble sequence allocated to a $k^{th}$ antenna is determined based on the following equation:

$$N_{st,k} = \left\lfloor \frac{N_{si} + N_t - 1 - \text{mod}(k - p, N_t)}{N_t} \right\rfloor$$

$$p = \left\lfloor \frac{N_t - \text{mod}(N_{si}, N_t)}{2} \right\rfloor$$

where $N_{st,k}$ denotes the number of sub-blocks allocated to an antenna k, $N_{si}$ denotes the total number of sub-blocks for an irregular channel bandwidth, $N_t$ denotes the number of the transmit antennas, and k denotes an antenna index, k having a value of $0, 1, \ldots, N_t-1$.

21. The apparatus of claim 20, wherein the preamble is a signal for distinguishing a cell IDentifier (ID).

22. The apparatus of claim 20, wherein the sub-blocks each are constituted with a Quadrature Phase Shift Keying (QPSK) sequence of length 18.

23. The apparatus of claim 20, further comprising:
a covering processor for, before the preamble is transmitted, multiplying the preamble by a covering sequence which decreases a Peak to Average Power Ratio (PAPR).

24. The apparatus of claim 20, wherein the preamble sequence comprises sub-blocks where a total number of the sub-blocks corresponds to a channel bandwidth.

25. The apparatus of claim 24, wherein the sub-blocks of the preamble are distributed to the transmit antennas based on at least one of a number of the transmit antennas and the total number of the sub-blocks.

26. The apparatus of claim 25, further comprising:
an allocator for allocating the sub-block to each of the transmit antennas; and
a modulator for generating preamble signals to be transmitted through the transmit antennas,
wherein the transmitter transmits the preamble signal through the transmit antennas.

27. The apparatus of claim 26, wherein the allocator determines the number of sub-blocks per antenna and determines locations of the sub-blocks per antenna.

28. The apparatus of claim 27, wherein the locations of the sub-blocks per antenna is determined so that consecutive sub-blocks are allocated to each of the transmit antennas.

29. The apparatus of claim 28, wherein the locations of the sub-blocks allocated to the $k^{th}$ antenna are determined based on the following equation:

$$\text{location of sub-blocks allocated to antenna } k = t + \sum_{i=0}^{k-1} N_{st,i}$$

where t denotes an integer between zero and $N_{st,k}-1$, $N_{st,i}$ denotes the number of sub-blocks allocated to an antenna i, and $N_{st,-1}$ is zero.

30. The apparatus of claim 20, further comprising:
a generator for determining the preamble sequence.

31. An apparatus of a receiving end for receiving a preamble in a wireless communication system, the apparatus comprising:
a receiver for receiving a preamble sequence from a transmitting end through a plurality of transmit antennas,
wherein a number of sub-blocks of the preamble sequence allocated to a $k^{th}$ antenna is determined based on the following equation:

$$N_{st,k} = \left[ \frac{N_{si} + N_t - 1 - \text{mod}(k - p, N_t)}{N_t} \right]$$

$$p = \left[ \frac{N_t - \text{mod}(N_{si}, N_t)}{2} \right]$$

where $N_{st,k}$ denotes the number of sub-blocks allocated to an antenna k, $N_{si}$ denotes the total number of sub-blocks for an irregular channel bandwidth, $N_t$ denotes the number of the transmit antennas, and k denotes an antenna index, k having a value of $0, 1, \ldots, N_t-1$.

32. The apparatus of claim 31, wherein the controller acquires antenna number information of the transmitting end, and determines the number and locations of the sub-blocks of the preamble sequence allocated to each of the transmit antennas.

33. The apparatus of claim 31, wherein the preamble sequence comprises sub-blocks where a total number of the sub-blocks corresponds to a channel bandwidth.

34. The apparatus of claim 33, wherein the sub-blocks of the preamble are distributed to the transmit antennas based on at least one of a number of the transmit antennas and the total number of the sub-blocks.

35. The apparatus of claim 34, wherein locations of the sub-blocks per antenna are determined so that consecutive sub-blocks are allocated to each of the transmit antennas.

36. The apparatus of claim 35, wherein the locations of the sub-blocks allocated to the $k^{th}$ antenna are determined based on the following equation:

$$\text{location of sub-blocks allocated to antenna } k = t + \sum_{i=0}^{k-1} N_{st,i}$$

where t denotes an integer between zero and $N_{st,k}-1$, $N_{st,i}$ denotes the number of sub-blocks allocated to an antenna i, and $N_{st,-1}$ is zero.

* * * * *